US005745887A

United States Patent [19]

Gargiulo et al.

[11] Patent Number: 5,745,887

[45] Date of Patent: Apr. 28, 1998

[54] METHOD AND APPARATUS FOR REMOTELY CHANGING SECURITY FEATURES OF A POSTAGE METER

[75] Inventors: Joseph L. Gargiulo, Trumbull; Charles F. Murphy, III, Milford, both of Conn.

[73] Assignee: Pitney Bowes Inc., Stamford, Conn.

[21] Appl. No.: 701,903

[22] Filed: Aug. 23, 1996

[51] Int. Cl.[6] ............................ G06F 17/00; G07B 17/04

[52] U.S. Cl. ........................ 705/410; 235/375; 235/382.5; 340/825.31; 705/401; 705/408

[58] Field of Search ................................ 235/375, 382.5; 340/825.3, 825.31; 364/464.11, 464.18, 464.2; 380/49

[56] References Cited

U.S. PATENT DOCUMENTS

| | | | |
|---|---|---|---|
| 4,097,923 | 6/1978 | Eckert, Jr. et al. | 364/464.13 |
| 4,253,158 | 2/1981 | McFiggans | 364/464.11 X |
| 4,802,218 | 1/1989 | Wright et al. | 380/23 |
| 4,933,849 | 6/1990 | Connell et al. | 364/400 |
| 5,077,660 | 12/1991 | Haines et al. | 364/464.2 |
| 5,107,455 | 4/1992 | Haines et al. | 395/828 |
| 5,181,245 | 1/1993 | Jones | 380/23 |
| 5,202,914 | 4/1993 | Kim et al. | 379/97 |
| 5,237,506 | 8/1993 | Horbal et al. | 235/382 X |
| 5,369,401 | 11/1994 | Haines | 364/464.13 |
| 5,477,246 | 12/1995 | Hirabayashi et al. | 347/12 |
| 5,490,077 | 2/1996 | Freytag | 235/375 X |
| 5,583,779 | 12/1996 | Naclerio et al. | 364/464.18 |
| 5,612,884 | 3/1997 | Haines | 364/464.13 |

*Primary Examiner*—Edward R. Cosimano

*Attorney, Agent, or Firm*—Steven J. Shapiro; Melvin J. Scolnick

[57] ABSTRACT

A value printing system having a printing mechanism; a device for moving the printing mechanism in a first predetermined manner during printing by the printing mechanism to record an indication of value on a recording medium; and apparatus, remote from the printing mechanism and the moving device, for effecting the moving device to change the movement of the printing mechanism from the first predetermined manner to a second predetermined manner different from the first predetermined manner during printing by the printing mechanism to record the indication of value on the recording medium. A second value printing system includes a printing module which prints an indication of value on a recording medium; apparatus for accounting for the indication of value printed, the accounting apparatus and printing module communicating with each other to effectuate printing by the printing module; an authorizing device for authorizing the authenticity of the communication between the accounting apparatus and the printing module as a prerequisite to printing the indication of value on the recording medium, the authorizing device including the use of at least one secret key stored in the value printing system; and structure, remote from the printing module and the accounting apparatus and the authorizing device, for initiating changing of the at least one secret key. A method includes the steps of sending a code from a computer, remotely located from the printing mechanism, the accounting apparatus and the authorizing apparatus, to the value printing system; and utilizing the code to change the stored secret key.

10 Claims, 3 Drawing Sheets

METHOD AND APPARATUS FOR REMOTELY CHANGING SECURITY FEATURES OF A POSTAGE METER

BACKGROUND

This invention relates to a method and apparatus for remotely changing security features of a postage meter and more particularly relates to a method and apparatus for remotely changing: 1) printhead movement and 2) keys which are used in a meter authentication process.

Electronic postage meters are currently used throughout the world. These electronic postage meters often use digital printing technology, such as ink jet printing, to print a postal indicia on a mailpiece. The postal indicia serves as evidence that postage has been paid. In order to drive down the cost of such electronic postage meters, inexpensive digital printheads may be used. Such inexpensive digital printheads typically have a low nozzle density. If these low cost digital printheads are used however, the printhead may be required to make multiple passes over the mailpiece in the area where the indicia is to be printed in order to produce an indicia having a print quality which is acceptable to the postal authority. For example, in a two pass printing system the printhead would produce an indicia image during a first pass. Then, during a subsequent pass of the printhead over the same area in which the indicia was previously printed, a complete second indicia image can be formed which is interlaced (such as being offset by one pixel from the first indicia)with the first printed indicia image such that the combination of the two indicia images produces a higher density indicia image as compared to either of the individual indicia images produced during the first and second printhead passes. Thus, the resulting indicia image is significantly more defined. However, the individual printing of two complete indicia, which are offset and interlaced with each other, to produce a final indicia image presents a potential security problem in that if someone stacked two mailpieces in the postage meter and removed one after the first pass of the printhead, the result would be that two mailpieces are produced with each mailpiece having an indicia image printed thereon. The postage meter, however, would only have accounted for one printed indicia. While the indicia printed on each mailpiece would be of significantly lower quality than the desired combined indicia image, it is possible that each of these images could pass through the postal processing stream without being detected as an invalid indicia. Accordingly, the postal service would be losing revenue.

In order to overcome this problem, it has been proposed to only print a portion of the postage indicia image during the second pass of the printhead. The printed portion would be interlaced with the indicia image produced during the first printhead pass and would provide increased density to selected portions of the indicia image. The printed portion of the second pass would not necessarily be a recognizable indicia in and of itself. However, depending on the amount of detail that is printed during the second pass, there still exists the possibility that a mailpiece just having a portion of the indicia image could pass through the postal stream without being detected as an invalid indicia. Thus, whether or not in practice this potential problem will occur, it is important to be able to alter the printing operation of the postage meter printhead after placement of these meters with the customer if the situation dictates that such alteration is warranted. That is, if a particular postal authority decides that subsequent to providing postage meters to users that either of the above problems has become a reality, it will be necessary to modify all of the meters being used to provide a more secure printing environment. It is desirable that such a change to the printhead printing operation be accomplished without requiring the printhead and/or the postage meter to be physically brought back to the meter manufacturer or the postal service.

An additional potential security issue is also present in electronic postage meters because in many of these meters the functionality of the postage meter vault and the digital printhead control have been put into separate modules. This modularization allows the vault and the printhead modules to be independently changed in any particular meter, and permits the use of multiple removable external vaults (such as smartcards) to be used with a single meter base having the printhead module therein. However, since the vault and meter are no longer physically secured together, as in older meters, and they communicate with each other during each postage transaction via a non-secure communications link, tampering with the postage meter is possible via an attack on the non-secure communications link. It has therefore been suggested that a mutual authentication procedure take place between the printhead module and the printhead vault prior to the postage transaction being authorized. A representative example of a mutual authentication procedure is set forth in U.S. Pat. No. 4,802,218. Most of the known mutual authentication procedures perform some type of encrypted communication between the vault and the printhead modules which communication is based upon the use of an internally stored secret key in conjunction with an algorithm. However, in the event that the security of the stored secret key is compromised, it would be possible for someone to print postal indicia without the proper accounting taking place, although details of the algorithm would still have to be obtained to make this possible. Accordingly, it is desirable to have the ability to diversify (change) the secret key or secret keys which are used by the postage meter during its authentication procedure in the event that the originally stored secret keys have been compromised. Moreover, the ability to diversify the keys in a remote manner is also needed in order to prevent requiring the user to physically bring the meter to either the meter manufacturer or the cognizant postal authority.

SUMMARY OF THE INVENTION

It is an object of the invention to provide a system for printing value which can be remotely modified to change its printing operation for security purposes. This object is met by a value printing system having a printing mechanism; a device for moving the printing mechanism in a first predetermined manner during printing by the printing mechanism to record an indication of value on a recording medium; and apparatus, remote from the printing mechanism and the moving device, for effecting the moving device to change the movement of the printing mechanism from the first predetermined manner to a second predetermined manner different from the first predetermined manner during printing by the printing mechanism to record the indication of value on the recording medium.

Yet another object of the invention is to provide a value printing system which can remotely change stored keys used in authenticating the value printing system. This object is met by a value printing system including a printing module which prints an indication of value on a recording medium; apparatus for accounting for the indication of value printed, the accounting apparatus and printing module communicating with each other to effectuate printing by the printing module; an authorizing device for authorizing the authenticity of the communication between the accounting apparatus and the printing module as a prerequisite to printing the indication of value on the recording medium, the authorizing device including the use of at least one secret key stored in the value printing system; and structure, remote from the printing module and the accounting apparatus and the authorizing device, for initiating changing of the at least one secret key.

Still another object is to provide a method for changing a secret key stored in the above described value printing system. This object is met by the method including the steps of sending a code from a computer, remotely located from the printing mechanism, the accounting apparatus and the authorizing device, to the value printing system; and utilizing the code to change the stored secret key.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

Figure 1:
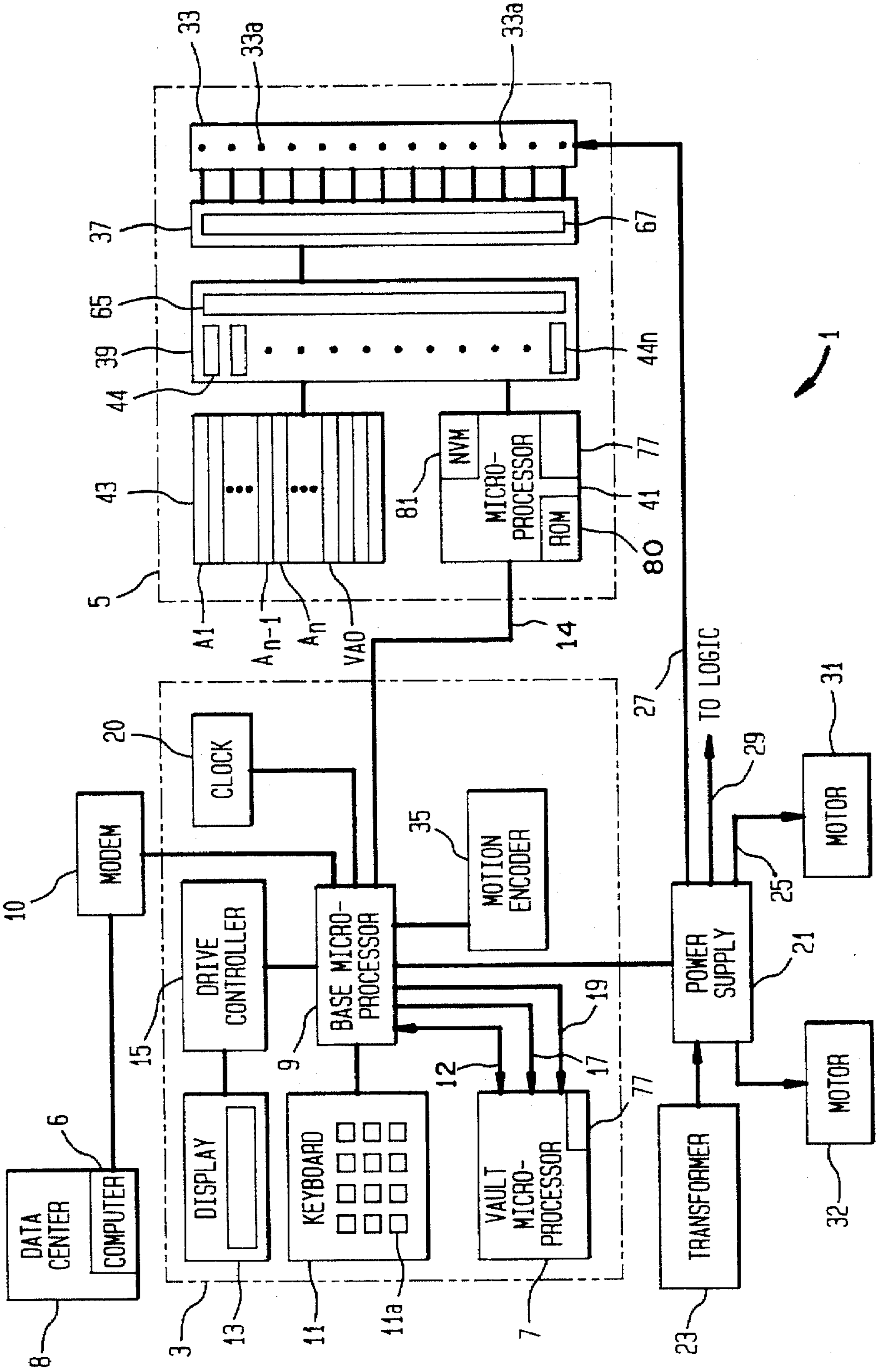
FIG. 1 is a schematic electrical block diagram of an electronic postage meter incorporating the claimed invention.

FIG. 1 shows a schematic representation of a postage meter 1 implementing the invention. Postage meter 1 includes a base 3 and a printhead module 5. Base 3 includes a first functional subsystem referred to as a vault microprocessor 7 and a second functional subsystem referred to as a base microprocessor 9. Vault microprocessor 7 has software and associated memory to perform the accounting functions of postage meter 1. That is, vault microprocessor 7 has the capability to have downloaded therein in a conventional manner a predetermined amount of postage funds from a central computer 6 of a remote data center 8 via a telephone modem 10. Such a remote postage meter charging system is described in U.S. Pat. No. 4,097,923. During each postage transaction, vault microprocessor 7 checks to see if sufficient funds are available. If sufficient funds are available, vault microprocessor 7 debits the amount from a descending register, adds the amount to an ascending register, and sends the postage amount to the printhead module 5 via the base microprocessor 9. Base microprocessor 9 also sends the date of submission data to the printhead module 5, via line 84, so that a complete indicia image can be printed.

Vault microprocessor 7 thus manages the postage funds with the ascending register representing the lifetime amount of postage funds spent, the descending register representing the amount of funds currently available, and a control sum register showing the running total amount of funds which have been credited to the vault microprocessor 7. Additional features of vault microprocessor 7 which can be included are a piece counter register, encryption algorithms for generating vendor and postal tokens, and software for requiring a user to input a personal identification number which must be verified by the vault microprocessor 7 prior to its authorizing any vault transaction. Alternatively, the verification of the personal identification number could be accomplished by either the base microprocessor 9 or the print module microprocessor 41 (discussed below). Additionally, and as previously discussed, the postage meter vault can be charged with additional funds from the data center.

Base microprocessor 9 acts as a traffic cop in coordinating and assisting in the transfer of information along data line 12 between the vault microprocessor 7 and the printhead module 5, as well as coordinating various support functions necessary to complete the metering function. Base microprocessor 9 interacts with keyboard 11 to transfer user information input through keyboard keys 11*a* (such as, postage amount, date of submission) to the vault microprocessor 7. Additionally, base microprocessor 9 sends data to a liquid crystal display 13 via a driver/controller 15 for the purpose of displaying user inputs or for prompting the user for additional inputs. Moreover, base microprocessor 9 provides power and a reset signal to vault microprocessor 7 via respective lines 17, 19. A clock 20 provides date and time information to base microprocessor 9. Alternatively, clock 20 can be eliminated and the clock function can be accomplished by the base microprocessor 9. Base microprocessor 9 also provides a clock signal to vault microprocessor 7.

Postage meter 1 also includes a conventional power supply 21 which conditions raw A.C. voltages from a wall mounted transformer 23 to provide the required regulated and unregulated D.C. voltages for the postage meter 1. Voltages are output via lines 25, 27, and 29 to a printhead motor 31, printhead 33 and all logic circuits. Motor 31 is used to control the movement of the printhead 33 relative to the mailpiece upon which an indicia image is to be printed. Base microprocessor 9 controls the supply of power to motor 31 to ensure the proper starting and stopping of printhead 33 movement after vault microprocessor 7 authorizes a postage transaction.

Base 3 also includes a motion encoder 35 that senses the movement of the printhead motor 31 so that the exact position of printhead 33 along a first direction of movement can be determined. Signals from motion encoder 35 are sent to printhead module 5 to coordinate the energizing of individual printhead elements 33*a* in printhead 33 with the positioning of printhead 33. Alternatively, motion encoder 35 can be eliminated and the pulses applied to stepper motor 31 can be counted to determine the location of printhead 33 and to coordinate energizing of printhead elements 33*a*. Additionally, a second motor 32 which is used to move the printhead 33 in a direction perpendicular to the first direction of printhead movement relative to the position of printhead 33 in the first direction of movement.

Printhead module 5 includes printhead 33, a printhead driver 37, a drawing engine 39 (which can be a microprocessor or an Application Specific Integrated Circuit (ASIC)), a microprocessor 41 and a non-volatile memory 43. NVM 43 has stored therein indicia image data which can be printed on a mailpiece. Microprocessor 41 receives a print command, the postage amount, and date of submission via the base microprocessor 9. The postage amount and date of submission are sent from microprocessor 41 to the drawing engine 39 which then accesses non-volatile memory 43 to obtain the required indicia image data therefrom which is stored in registers 44 to 44*n*. The stored image is then downloaded on a column-by column basis by the drawing engine 39 to the printhead driver 37, via column buffers 45,47 in order to energize individual printhead elements 33*a* to print the indicia image on the mailpiece. The individual column-by-column generation of the indicia image is synchronized with movement of printhead 33 until the full indicia is produced. Specific details of the generation of the indicia image is set forth in copending application Ser. No. 08/554,179 filed Nov. 6, 1995, which is incorporated herein by reference and which has issued as U.S. Pat. No. 5,651, 103.

Figure 2:
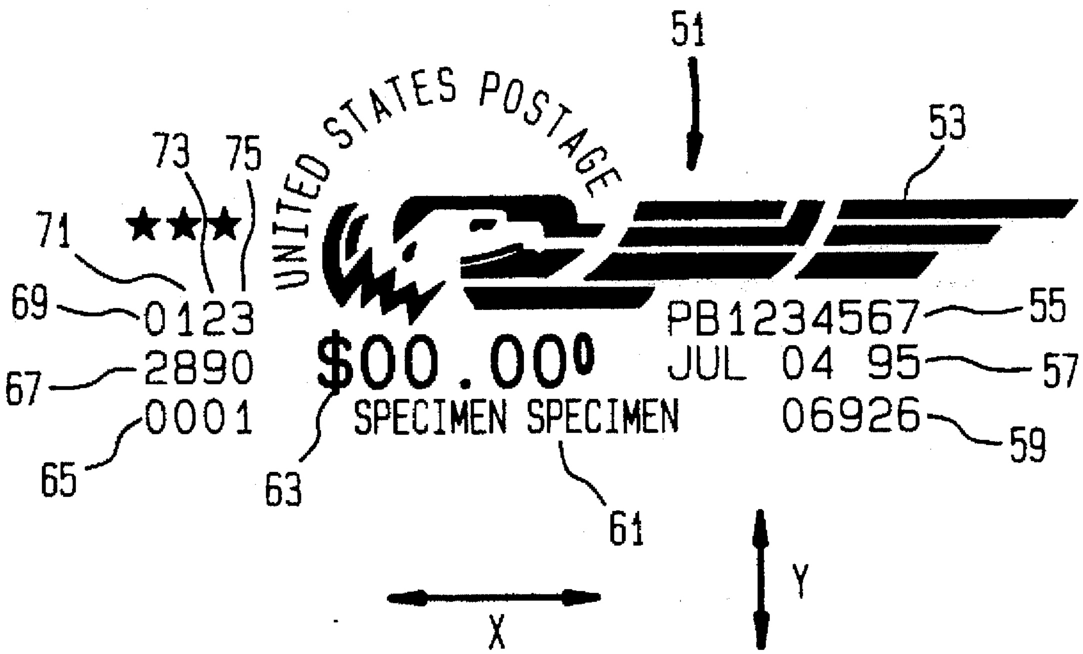
FIG. 2 is a postage indicia produced by the postage meter.

FIG. 2 shows an enlarged representative example of a typical postage indicia which can be printed by postage meter 1 for use in the United States. The postage indicia 51 includes a graphical image 53 including the 3 stars in the upper left hand corner, the verbiage "UNITED STATES POSTAGE", and the eagle image; an indicia identification number 55; a date of submission 57; the originating zip code 59; the words "mailed from zip code" 61, which for the ease of simplicity is just being shown with the words "SPECIMEN SPECIMEN"; the postage amount 63; a piece count 65; a check digits number 67; a vendor I.D. number 69; a vendor token 71; a postal token 73; and a multipass check digit 75. While most of the portions of the indicia image 51 are self explanatory, a few require a brief explanation. The vendor I.D. number identifies who the manufacturer of the meter is, and the vendor token and postal token numbers are encrypted numbers which can be used by the manufacturer and post office, respectively, to verify if a valid indicia has been produced. As previously discussed, the postal indicia 51 is produced during two individual passes of printhead 33 along a predetermined length of the first direction of movement. That is, during a first pass of the printhead 33 in the "X" direction, a complete indicia image is printed. Then, base microcontroller 9 activates motor 31 to shift the printhead 33 in the "Y" direction. Once the shift has occurred, motor 36 is deenergized and during a second pass of printhead 33 in the "X" direction either a second indicia is printed or portions of the indicia are printed. The image printed during the second pass is interlaced with the first indicia image resulting in a combined indicia image of increased density as compared to either of the individual images. Details of a specific implementation of the two pass printing system are discussed in U.S. patent application Ser. No. 08/579,505, filed Dec. 27, 1995 which is hereby incorporated by reference.

The FIG. 2 indicia is simply a representative example and the information contained therein will vary from country to country. In the context of this application the terms indicia and indicia image are being used to include any specific requirements of any country.

A benefit of the above-described distributed postage meter system is that because of the divided functionality, less expensive microprocessors can be utilized resulting in a lower cost postage meter. Moreover, the modularity of the system allows for easy replacement of the vault and printing modules in the event of failure of either of these modules. However, as previously discussed, the use of a distributed digital system where data is transferred over physically unsecured data lines (for example, data lines 12, 84) results in the system being susceptible to having its data intercepted and reproduced. If such interception and reproduction is accomplished, it is possible that printing module 5 could be driven to print an indicia image without the necessary accounting taking place.

In order to overcome the security problem discussed above, a secure electronic link is provided between vault microprocessor 7 and print module microprocessor 41. The secure electronic link is accomplished through an encryption process which provides for a mutual authentication between the printhead module 5 and the vault microprocessor 7 prior to authorizing printing of the indicia image, debiting of postage, and updates to certain vault data such as PIN location and account numbers The inventive encryption process significantly decreases the possibility of data interception and reproduction. Moreover, in the preferred embodiment base microprocessor 9 acts as a non-secure communication channel between the vault microprocessor 7 and print module microprocessor 41. However, the secure linked discussed above and described in more detail below can be applied between any subsystems of postage meter 1.

Figure 3:
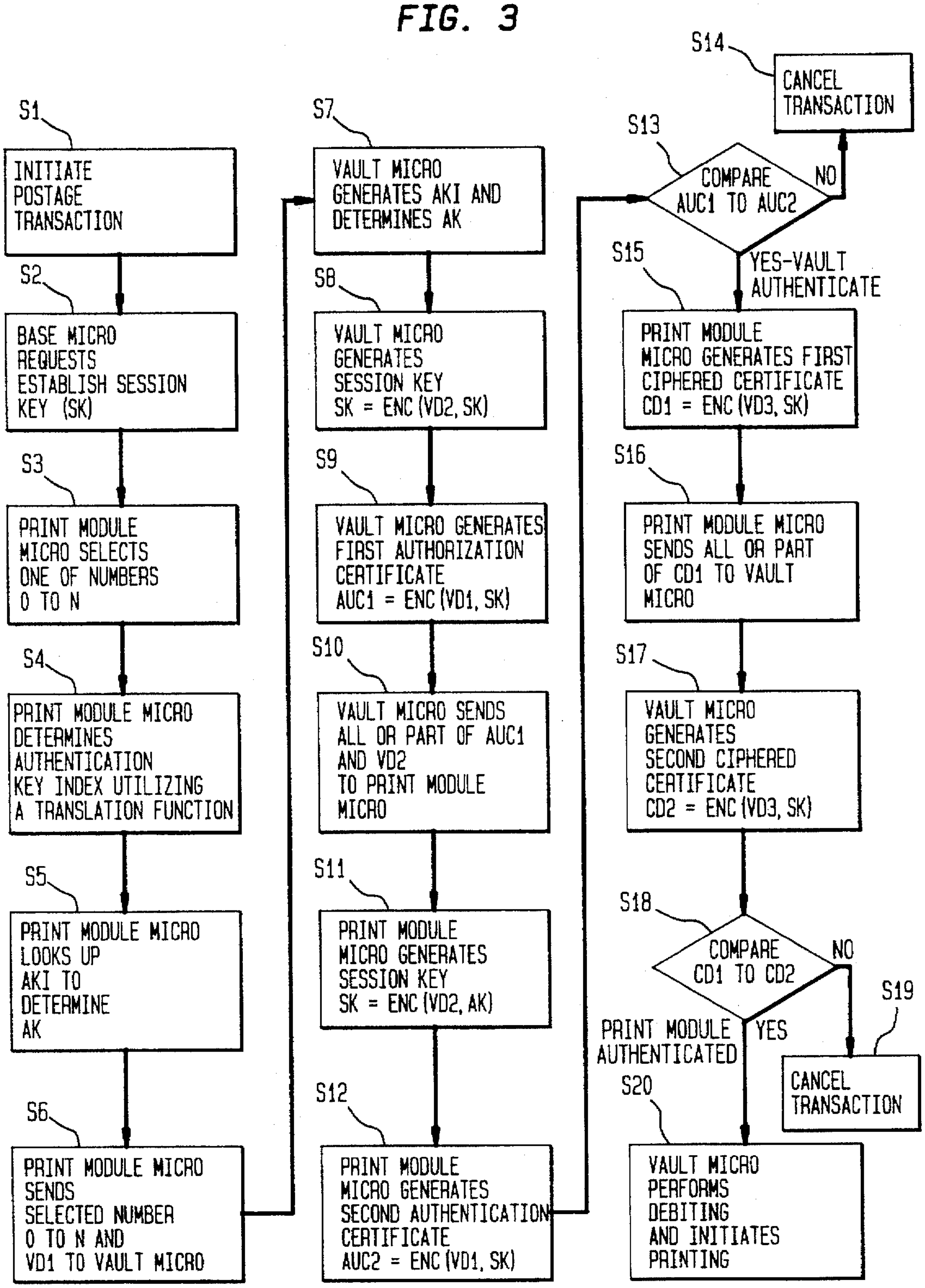
FIG. 3 is a flow chart of an authentication procedure incorporated in the postage meter.

The inventive method is described in FIG. 3. In step SI an operator enters a desired postage amount for a postage transaction via the keyboard 11. Upon insertion of the mailpiece into the postage meter 1 and its clamping in place by a platen (not shown), base microprocessor 9 sends a signal to vault microprocessor 7 and print module microprocessor 41 requesting that a session key (SK) be established as shown in step S2. In order to establish the session key, vault microprocessor 7 and printhead module microprocessor 41 each have an identical set of "M" authentication keys (AK) stored in memory, with each authentication key having a particular index (1 to M) associated therewith. In addition, print module microprocessor 41 also has a set of numbers "0 to N" stored therein which are used to select a particular one of the authentication keys. That is, print module microprocessor 41 is programmed for each postage transaction to select one of the set of numbers "0 to N" either on a sequential or random basis (step S3). Assuming for example that the number "N" is selected, print module microprocessor 41 determines the particular authentication key index AKI (step S4) utilizing a conventional translation function that creates an index within the range 1 to M. Since the authentication keys AK1 to AKM are stored in a look-up table in the vault microprocessor 7 and print module microprocessor 41, the index AKI can be associated with a particular key, such as for example, AK1 (step S5). It is important to note that the set of numbers 0 to N can be much larger than the number of keys 1 to M. Therefore, the combination of a large set of numbers 0 to N combined with the random selection of one of these numbers to create the index AKI results in a very secure process.

After print module microprocessor 41 selects one of the numbers 0 to N, that number is sent to vault microprocessor 7 together with a first piece of data VD1 that varies with each postage transaction and is stored in register counter 77 in print module microprocessor 41 (step S6). Upon receipt, the vault microprocessor 7, which has stored therein an identical authentication key look-up table and the AKI translation function used by the print module microprocessor 41, independently uses the selected number 0 to N to generate AKI and identify the same authentication key AK (step S7) being utilized by the print module microprocessor 41. The vault microprocessor 7 also has a register 79 whose contents VD2 are variable for each postage transaction and are used together with the authentication key AK to create the session key SK (step S8). That is, a conventional encryption algorithm is applied to VD2 and the authentication key to produce the session key:

SK=ENCRYPT(VD2, AK).

Once vault microprocessor 7 determines the session key, it generates a first authentication certificate (AUC1) (step S9) as follows:

AUC1=ENCRYPT(VD1, SK)

Subsequent to generation of the first authentication certificate, vault microprocessor 7 sends all or part of the first authentication certificate and VD2 to the print module microprocessor 41 (step S10). That is, if AUC1 is, for example, eight bytes of data, it can be sent in total or a truncation algorithm can be applied to it to only send a predetermined number of bytes of AUC1. The print module microprocessor 41, upon receipt of AUC1, independently determines SK (step S11) in the same manner as vault microprocessor 7 since print module microprocessor 41 has stored therein the DES algorithm, has itself generated AK, and has received VD2 from vault microprocessor 7.

Subsequent to its generation of SK, print module microprocessor 41 generates a second authentication certificate:

AUC2=ENCRYPT(VD1, SK)

which should be the same as AUC1 (step S12). In the event that print module microprocessor compares AUC1 to AUC2 (step S13) and they are not the same, the print module microprocessor 41 will initiate cancellation of the postage transaction (step S14). On the other hand, if AUC1 and AUC2 are the same, print module microprocessor 41 has authenticated that vault microprocessor 7 is a valid vault. It is to be noted that if a truncated portion of AUC1 is sent from vault microprocessor 7 to print module microprocessor 41, then print module microprocessor 41 must apply the same truncation algorithm to AUC2 prior to the comparison step.

Subsequent to vault microprocessor 7 authentication, print module microprocessor 41 generates a first ciphered data certificate "CD1" where:

CD1=ENCRYPT(VD3, SK)

and VD3 represents a variable piece of data within the meter 1 such as piece count or date of submission, which data is made available to both the vault microprocessor 7 and print module microprocessor 41 (step S15). Upon generation of CD1, it is sent in whole or in part (as discussed in connection with AUC1, AUC2) to vault microprocessor 7 (step S16). Vault microprocessor 7 then generates its own ciphered certificate of data "CD2" by applying the encryption algorithm to VD3 and the session key SK generated by vault microprocessor 7 (step S17). Vault microprocessor 7 then compares CD1 to CD2 (step S18) and if they do not match, vault microprocessor 7 initiates cancellation of the postage transaction (step S19). In the event that CD1 and CD2 are the same, the vault microprocessor 7 has authenticated print module microprocessor 41 and mutual authentication between vault microprocessor 7 and print module microprocessor 41 has been completed. Subsequently, vault microprocessor 7 is prepared to debit the required postage amount in the accounting module, Upon completion of the debit, a print command is sent to the printhead module 5 to initiate printing of the indicia image (step S20).

The above process provides an extremely secure electronic link between subsystems because all data which is transmitted between the subsystems is variable for each postage transaction. While this does not necessarily have to be the case, it provides increased security by reducing the predictability of the data being transferred. The use of the variable data (VD1, VD2, VD3) ensures the uniqueness of the ciphered values (SK, AUC1, AUC2, CD1, CD2) for each postage transaction. Moreover, the session key, which is required to initiate the whole mutual authentication procedure and to generate AUC1, AUC2, CD1 and CD2, is never transmitted between the individual subsystems thereby guaranteeing the secure knowledge of the session key among the subsystems. Finally, if a truncation algorithm is used in connection with any or all of the generated certificates, security is further enhanced since the truncation algorithm must be known in order to complete the postage transaction.

In view of the foregoing description of an electronic postage meter having a multiple pass printing capability and a mutual authentication process, and the previously discussed potential security issues associated with each of these features, it is clear that future changes to the security features of the postage meter may be required subsequent to the postage meter being placed in its operating environment. With respect to the multiple pass printing feature of postage meter 1, it is possible to remotely change postage meter 1 from a two pass printing scheme to a single pass printing scheme. That is, postage meter 1 has within its encoded software in base microprocessor 41 a time-out feature that prevents postage meter 1 from operating if it does not communicate with data center 8 within a fixed time period, such as for example a four month period. Thus, use can be made of this forced communication with data center 8 to change the printing operation of printhead 33. That is, when central computer 6 of data center 8 is in communication with postage meter 1 it can, for example, send out a secure one byte or a plurality of bytes print change message to base microprocessor 9, via the modem 10, requiring that postage meter 1 change from a two pass system to a one pass system. Base microprocessor 9 would in turn transfer this print change message to printhead microprocessor 41. Microprocessor 41 receives the print change message and interprets it via a software program stored in its ROM 80. Microprocessor 41 then sets a flag stored in its non-volatile memory 81, which flag identifies whether a two pass or a one pass printing process will be utilized. Upon identification of the one pass printing requirement, microprocessor 41 provides this information to ASIC 39 which then only drives printhead 33 through its driver 37 to perform the first pass of printhead 33 to produce a single indicia image and does not exercise the feature of requiring a second pass of printhead 33 for producing either a second complete indicia or a portion thereof either of which would be interlaced with the first produced indicia during a two pass printing technique.

It is important to note that although postage meter 1 could be set up so that the print change message received by microprocessor 41 from data center 8 would allow the postage meter to be continuously remotely switched between a one pass printing system and a two pass printing system, it will often be desirable to ensure that the change from a two pass printing system to a one pass printing system is irreversible. This is accomplished in the instant invention via the software program stored in ROM 80. That is, the software program stored in ROM 80 is only capable of receiving and interpreting a print change message requiring a change from a two pass system to a one pass system. In the event that a message is received by microprocessor 41 requesting a change from a one pass to a two pass system, this message cannot be processed by microprocessor 41. Thus, the process for remotely changing printing operation of printhead 33 can be made to ensure that the change is irreversible.

While changing from a two pass system to one pass system has been discussed in the context of the preferred embodiment, it is very clear that the system can be arranged to change the operation of printhead 33 so that it can print an indicia in any number of printhead passes. Thus, it is foreseeable that this remote technique for changing the printing operation of printhead 33 could also be utilized to increase the number of passes of printhead 33 to produce a higher density and better quality indicia image in the event that a postal authority required such change in the future.

Figure 4:
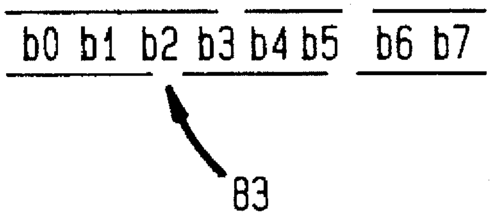
FIG. 4 is a meter modification code.

The data center 8 can also be used to effectively change, for example, the authentication keys (AK) utilized in the previously described mutual authentication procedure in the event that the security of any original authentication keys (AK) is compromised. This would be accomplished by central computer 6, of data center 8, sending a secure meter modification code to both printhead microprocessor 41 and vault microprocessor 7, via base microprocessor 9. FIG. 4 identifies a representative secure meter modification code 83 which could be utilized. As noted, secure meter modification code 83 consists of a single byte of information. The first three bits (b0, b1, b2) are randomly generated by central computer 6. The second three bits (b3, b4, b5,) are utilized to determine which of authentication keys (AK) are to be changed. The last two bits (b6, b7,) are utilized as the previously discussed print change message for changing the number of passes (or other characteristics) of printhead 33 so that the diversification (changing) of authentication keys (AK) and changing of the operation of printhead 33 can be accomplished via the sending of the single meter modification code message. In order to complete changing of the authentication keys (AK), both microprocessor 41 and vault microprocessor 7 would have at least one common algorithm stored therein which would utilize data bits b0, b1, and b2, to generate new authentication keys (AK). The use of known algorithms for generating keys is well known in the art, and the details of which are not herein described as they are not considered essential for an understanding of the claimed invention.

In an alternative embodiment, a plurality of common algorithms are stored in both vault microprocessor 7 and microprocessor 41 and a randomly selected one of these algorithms is used to change the authentication keys (AK). In this embodiment, the first bit, b0, of meter identification code 83 is designated to identify which of the stored common algorithms is to be used to create new authentication keys (AK). Thus, central computer 6 randomly selects which of the common algorithms are utilized. Upon identification of the algorithm, vault microprocessor 7 and print module microprocessor 41 would then use the data of bits b3, b4, and b5 to identify some or all of the authentication keys (AK) to change. The information in bits b1 and b2 are then used in a known manner with the selected algorithm to generate the new authentication keys (AK).

It is important to note that while the diversification of the authentication keys (AK) in postage meter 1 was used as a representative example of the type of secret keys that can be remotely changed, the instant invention is not limited to such keys. That is, any keys which are used in postage meter 1 for any type of security application can be diversified utilizing the inventive procedure and apparatus set forth herein. Moreover, vault microprocessor 7 can either be an embedded microprocessor within postage meter 1 or could be an external smart card which is inserted into postage meter 1 in a known manner. Additionally, while the invention has been described in connection with a postage meter, it is equally applicable to any type of device which dispenses value and requires security. Such additional devices could for example, be tax stamp machines, ticket vending machines, and lottery machines.

In the above-described embodiments, the print change message and meter modification code 83 sent by data center 8 to postage meter 1 were each identified as being "secure". that is, to prevent any unauthorized alteration of either the print change message or the meter modification code 83, they would both be encrypted at the data center. The encryption could, for example, be a known technique which utilizes a set of master keys and a known encryption algorithm, which technique is applied to the message at the data center. The postage meter would also have the same set of master keys and the algorithm so that it can decrypt the message. However, if the message or code were intercepted, the encryption scheme would have to be broken before any alteration of the message could possibly take place.

Additionally, and in order to ensure that the print change message and the meter modification code 83 have been received and properly executed by the postage meter 1, an encoded verification message sent by postage meter 1 must be received by data center 8. The verification message would identify the action taken in response to the received print change message or meter modification code 83. If the verification message is not consistent with the message or code sent by the data center or is not received by the data center 8, the data center 8 will no longer communicate with the postage meter 1 and the postage meter 1 will automatically disable itself of the fixed time perion of the aforementioned time-out feature.

In connection with the print change message, the printhead microprocessor 41 receives the message and has the master keys and algorithm to decrypt the message. Printhead microprocessor 41 also sends the verification message back to data center 8. On the other hand when a meter modification code 83 is sent by data center 8 to diversify the authentication keys (AK), both the vault microprocessor 7 and the printhead microprocessor 41 receive the code and each have the master keys and algorithm to decrypt the code. Moreover, in this situation the data center must receive a proper verification code from both the vault microprocessor 7 and printhead microprocessor 41 within the fixed time period or else the meter will be disabled.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims.

What is claimed is:

1. A value printing system comprising:

a printing mechanism;

means for moving the printing mechanism in a first predetermined manner during printing by the printing mechanism to record an indication of value on a recording medium; and means, remote from the printing mechanism and the moving means, for effecting the moving means to change the movement of the printing mechanism from the first predetermined manner to a second predetermined manner different from the first predetermined manner during printing by the printing mechanism to record the indication of value on the recording medium.

2. A system as recited in claim 1, further comprising means for ensuring that, at times when the effecting means effects the moving means to change the movement of the printing mechanism from the first predetermined manner to the second predetermined manner, the moving means cannot be subsequently effected by the effecting means to change the movement of the printing mechanism back to the first predetermined manner.

3. A system as recited in claim 2, wherein the first predetermined manner is two passes of the printing mechanism over a predetermined area on the recording medium and the second predetermined manner is a single pass of the printing mechanism over the predetermined area.

4. A system as recited in claim 3, wherein the indication of value is a postage indicia.

5. A system as recited in claim 4, further comprising a telephone modem and wherein the effecting means includes a data center in communication with the moving means via the telephone modem.

6. A value printing system comprising:

a printing module which prints an indication of value on a recording medium;

means for accounting for the indication of value printed, the accounting means and printing module communicating with each other to effectuate printing by the printing module;

means for authorizing the authenticity of the communication between the accounting means and the printing module as a prerequisite to printing the indication of value on the recording medium, the authorizing means including the use of at least one secret key stored in the value printing system; and means, remote from the printing module and the accounting means and the authorizing means, for initiating changing of the at least one secret key;

wherein the changing means includes a data center which sends a meter modification code to the authorizing means to effect changing of the secret key, the modification code is encrypted, both the printing module and the accounting means each have the secret key and include at least one common algorithm stored therein, the common algorithm utilized upon receipt of the meter modification code by both the printing module and the accounting means to change the stored secret key.

7. A system as recited in claim 6, wherein each of the accounting means and the printing module have a plurality of common algorithms stored therein and the data center randomly selects one of the plurality of algorithms to be used in changing the secret key in both the accounting means and the printing module and identifies the selected algorithm to the accounting means and the printing module via the meter modification code.

8. A system as recited in claim 7, wherein the indication of value is a postage indicia.

9. A system as recited in claim 6, wherein both the printing module and the accounting means each have a plurality of secret keys and at least one common algorithm stored therein, the common algorithm being utilized upon receipt of the meter modification code by both the printing module and the accounting means to change at least a selected one of the plurality of secret keys.

10. A system as recited in claim 9, wherein the meter modification code includes first and second portions, the first portion identifying the selected algorithm and data to be used by the selected algorithm in changing the selected one of the plurality of stored secret keys and the second portion identifying the selected one of the plurality of secret keys.

* * * * *